(12) United States Patent
Gupta et al.

(10) Patent No.: US 7,829,505 B2
(45) Date of Patent: Nov. 9, 2010

(54) METHOD FOR CONSTRUCTION OF OLIGONUCLEOTIDE MICROARRAYS

(75) Inventors: Kailash Chand Gupta, Delhi (IN); Pradeep Kumar, Delhi (IN); Shweta Mahajan, Delhi (IN)

(73) Assignee: Council of Scientific and Industrial Research, New Delhi (IN)

(*) Notice: Subject to any disclaimer, the term of this patent is extended or adjusted under 35 U.S.C. 154(b) by 548 days.

(21) Appl. No.: 11/645,112

(22) Filed: Dec. 26, 2006

(65) Prior Publication Data
US 2008/0146462 A1 Jun. 19, 2008

(30) Foreign Application Priority Data
Dec. 27, 2005 (IN) .................. 3483/DEL/2005

(51) Int. Cl.
*C40B 50/00* (2006.01)
(52) U.S. Cl. .............................. 506/23; 435/6
(58) Field of Classification Search ............... None
See application file for complete search history.

(56) References Cited

OTHER PUBLICATIONS

Kumar et al., Silanized Nucleic Acids: A General Platform for DNA Immobilization, *Nucleic Acids Research*, 2000, vol. 28, No. 14, pp. 1-6.
Serge L. Beaucage, Strategies in the Preparation of DNA Oilgonucleotide Arrays for Diagnostic Applications, *Current Medicinal Chemistry*, 2001, No. 8, pp. 1213-1244.
Todd Strother et al., Covalent Attachment of Oligodeoxyribonucleotides to Amine-Modified Si (001) Surfaces, 2000 *Oxford University Press*, Nucleic Acids Research, 2000, vol. 28, No. 18, pp, 3535-3841.
B. Vaijayanthi et al., Recent Advances in Oligonucleotide Synthesis and Their Applications, Dec. 2000 *Indian Journal of Biochemistry & Biophysics*, , vol. 40, pp. 377-391.
S. Mahajan et al., Oligonucleotide Microarrays: Immobilization of Phoshorylated Oligonucleotides on Epoxylated Surface, *Bioconjugate Chem.*, 2006, No. 17, pp. 1184-1189.
P. Kumar et al., A Rapid Method for the Construction of Oligonucleotide Arrays, May/Jun. 2003 *Bioconjugate Chemistry*, vol. 11, No. 3, pp. 5-7-512.
Markus Beier et al., Versatile Derivatisation of Solid Support Media for Covalent Bonding on DNA-Microchips, *1999 Oxford University Press*, Nucleic Acids Research 1999, vol. 27, No. 9, pp. 1970-1977.
P. Kumar et al., Construction of Oligonucleotide Arrays on a Glass Surface Using a Heterobifunctional Reagent, N-(2-Trifluoroethanesulfonatoethyl)-N-(Methyl)-Triethoxysilylpropyl-3-Amine (NTMTA), Nucleic Acids Research, 2004, vol. 32, No. 10, pp 1-9.
P. Kumar et al., Solid Phase Synthesis and Purification of 5'-Mercaptoalkylated Oligonucleotides, *Biorganic & Medicinal Chemistry Letters*, 1996, vol. 6, pp. 683-688.
S. Mahajan et al., An Efficient and Versatile Approach for the Construction of Oligonucleotide Microarrays, *ScienceDirect*, Bioorganic & Medicinal Chemistry Letters, 2006, No. 16, pp. 5654-5658.
P. Kumar et al., A versatile Solid Phase Method for the Synthesis of Oligonucleotide-3'-Phosphates, Pergamon Press, Tetrahedron Letters, 1991, vol. 32, No. 7, pp. 967-970.
Jagannath B. Lamture et al., Direct Detection of Nucleic Acid Hybridization on the Surface of a Charge Coupled Device, 1994 Oxford University Press, Nucleic Acids Research, 1994, vol. 22, No. 11, pp. 2121-2125.

*Primary Examiner*—Jeffrey S. Lundgren
(74) *Attorney, Agent, or Firm*—Smith, Gambrell & Russell, LLP

(57) ABSTRACT

Disclosed herein is a method for the preparation of oligonucleotide microarrays obviating the drawbacks to an extent, such as time consuming complex chemical reactions, preparation of modified supports/oligomer modifying reagents, use of activating/condensing reagent, low signal to noise ratio, poor immobilization and hybridization efficiencies, etc. Further, the prepared arrays can be used to detect single or multiple nucleotide mismatches using hybridization assay.

18 Claims, 3 Drawing Sheets

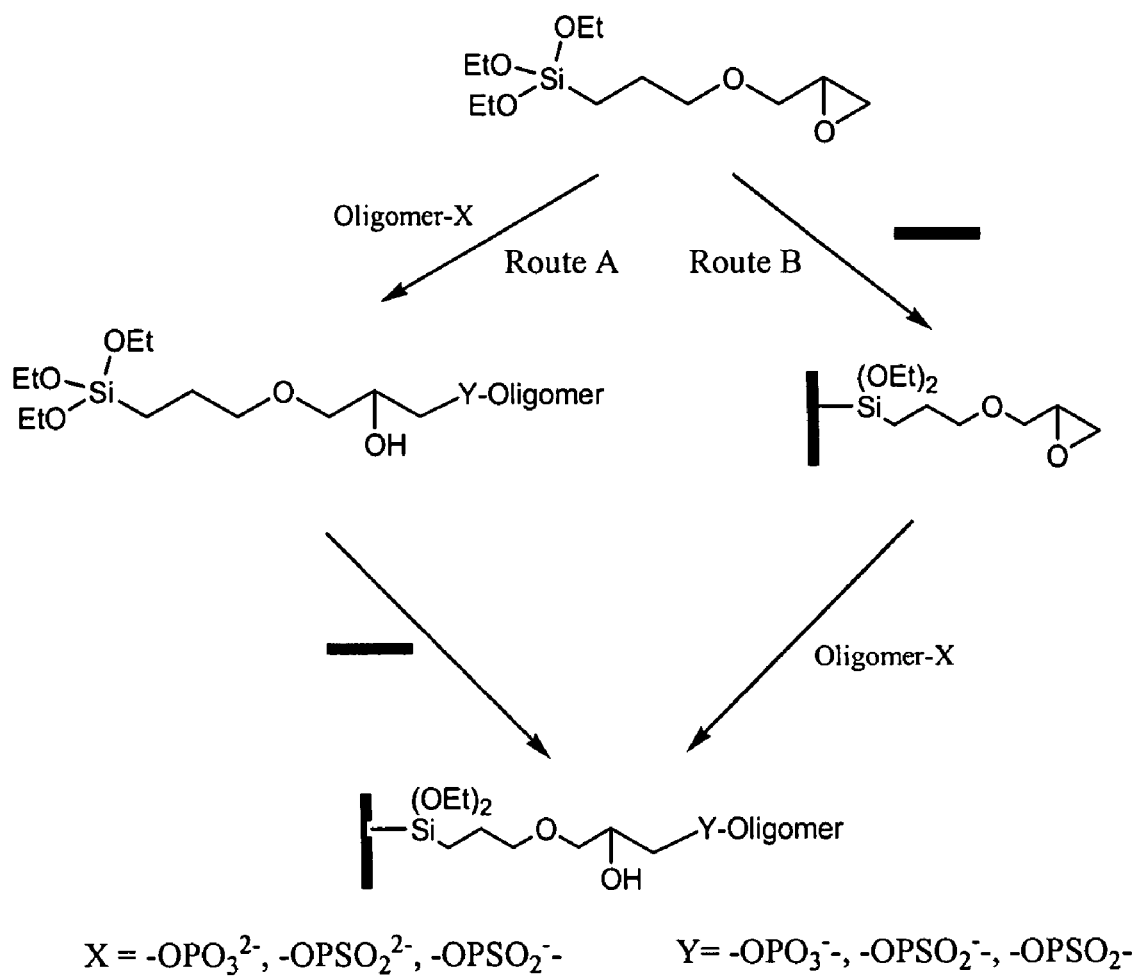
FIG. 1: Immobilization of modified oligonucleotides on epoxy surface

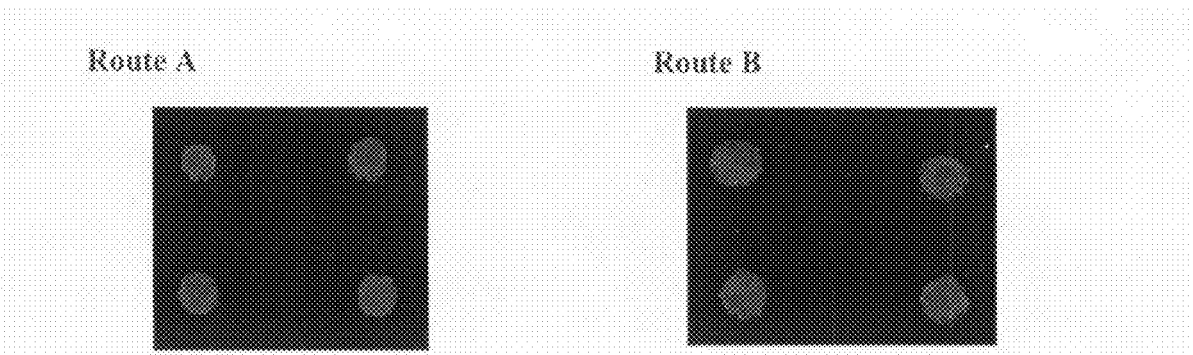

FIG. 2 : Fluorescence map obtained after hybridization and scanning under a laser scanner

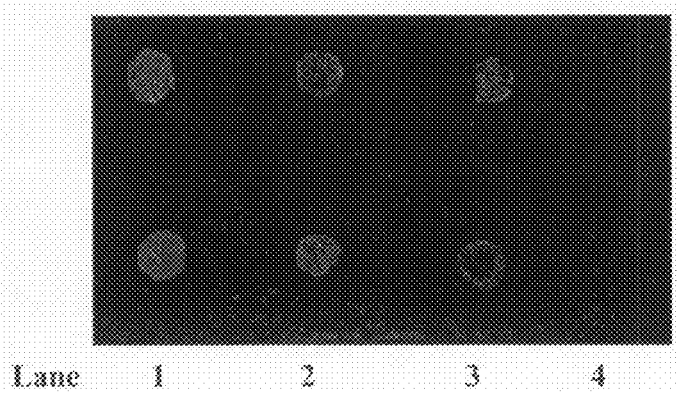

Lane    1    2    3    4

FIG. 3: Fluorescence map to detect nucleotide mismatches and specificity of immobilization via hybridization with fluoresceinyl-d (CTT CTT TTT CCT GTT ACC GT) (40 µM). Lane 1, d(ACG GTA ACA GGA AAA AGA AG)-$OPO_3^{2-}$; Lane 2, d(ACG GTA ACA GGA AAA AGC AG)-$OPO_3^{2-}$; Lane 3, d(ACG GTA ACA CGA AAA AGC AG)-$OPO_3^{2-}$; Lane 4, d(TTT TTT TTT TTT TTT TTT TT)-$OPO_3^{2-}$.

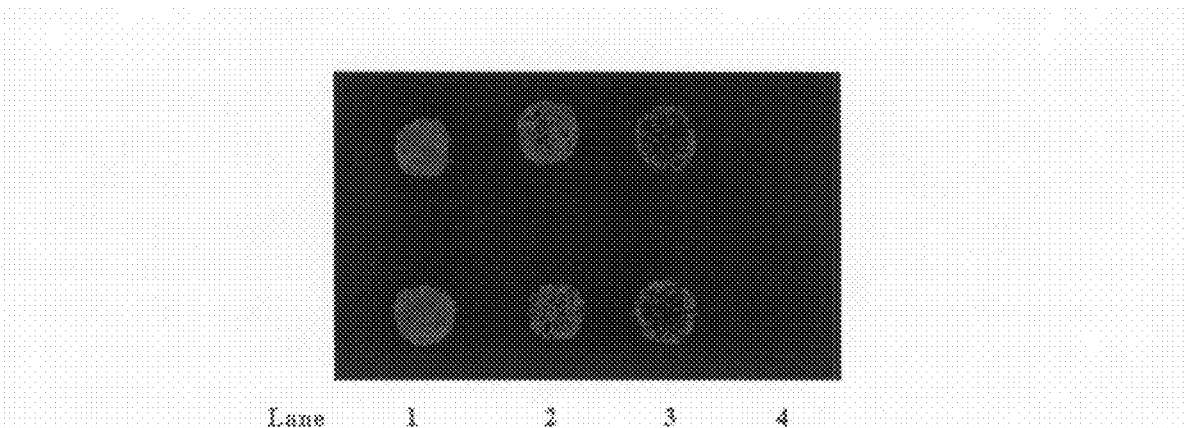

FIG. 4: Detection of nucleotide mismatches and specificity of immobilization via hybridization with labeled oligonucleotide, viz., Fluoresceinyl-d (CTT CTT TTT CCT GTT ACC GT) (40 µM). Lane 1, HS (CH$_2$)$_6$OPO$_3$-d (ACG GTA ACA GGA AAA AGA AG); Lane 2, HS (CH$_2$)$_6$OPO$_3$-d(ACG GTA ACA GGA AAA AGC AG); Lane 3, HS(CH$_2$)$_6$OPO$_3$-d(ACG GTA ACA CGA AAA AGC AG); Lane 4, HS(CH$_2$)$_6$OPO$_3$-d (TTT TTT TTT TTT TTT TTT TT).

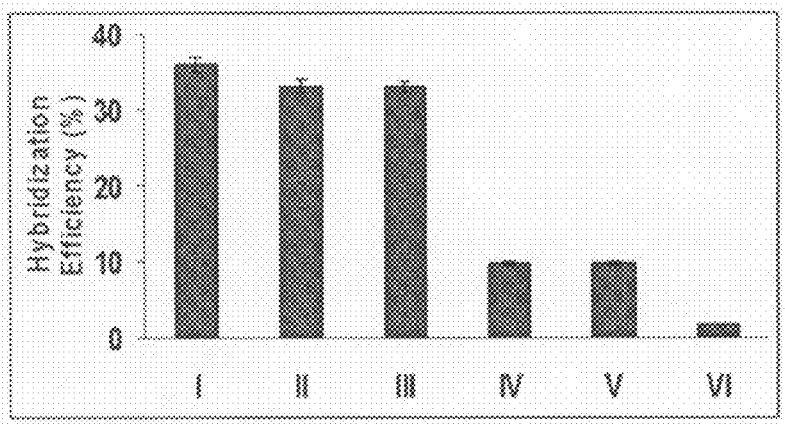

FIG. 5: Comparison of hybridization efficiency.
I : Phosphate-Epoxide; II : Thiophosphate-Epoxide; III : Thiol-Epoxide; IV : NTMTA method (Nucl. Acids Res., 32 (2004) e80); V : Amine-Epoxide (Nucl. Acids Res., 22 (1994) 2121); VI : Disulfide Approach (Nucl. Acids Res., 28 (2000) e71)

METHOD FOR CONSTRUCTION OF OLIGONUCLEOTIDE MICROARRAYS

FIELD OF THE INVENTION

The present invention relates to a novel method of preparation of oligonucleotide microarrays The invention specifically relates to a novel method of preparation of oligonucleotide microarrays wherein the appropriately modified oligonucleotides are immobilized on the modified polymer surface. The invention also uses easily introducible modification in oligonucleotides for immobilization purpose. The present invention also relates to the fields of molecular biology and nucleic acid analysis. More specifically, the invention relates to a novel method for attaching a desired molecule, preferably a nucleic acid or its conjugate, to a virgin silane or an appropriately modified surface.

BACKGROUND OF THE INVENTION

One of the most recent applications of synthetic oligonucleotides is their use in microarray technology. DNA microarray is a powerful tool, which allows the simultaneous detection of many different target molecules present in a sample. The technology deals with the covalent fixing of oligonucleotides (small fragments of DNA), cDNA, PCR fragments, etc on the solid or polymer surfaces. These DNA chips or bio-chips can be used for mutation detection, SNP analysis, disease diagnosis, monitoring of gene expression, etc. DNA Microarrays have extended the basic technique by using much smaller amounts of DNA probe, and more importantly by allowing researchers to perform tens of thousands of hybridization experiments in parallel. This allows researchers to view the response of whole genomes to various stimuli.

A number of methods have been reported for the preparation of oligonucleotide arrays. In general, there are some pre-requisites for the preparation and applications of oligonucleotide arrays: (a) arrays require the parallel preparation of a large number of oligonucleotides or the immobilization of a large number of previously prepared oligonucleotides, (b) each immobilized sequence must be addressable, (c) each immobilized oligomer sequence must be accessible to interaction with target biomolecule, e.g. to hybridization with analyte nucleic acids, and (d) this interaction must be susceptible to monitoring.

Basically, oligonucleotide arrays are solid surfaces consisting of hundreds or thousands of oligomers covalently attached at discrete locations, which are available for hybridization. Currently, two methods are being followed for the construction of oligonucleotide arrays. The first one involves direct synthesis of oligonucleotides at the pre-determined sites on the solid or polymeric surfaces using photolithographic technique (Fodor et al., Science (251 (1991) 767).

The second method is based on the immobilization of pre-synthesized oligonucleotides on the solid or polymeric surfaces using a suitable hetero- or homobifunctional reagent or a coupling reagent (Beier and Hoheisel, Nucl. Acids Res., 27 (1999) 1970). Alternatively, this can be achieved also by direct reaction between two functionally active groups present on the surface and oligomer moiety. The later method provides flexibility in the sense that it does not require expensive chemistry and sophisticated instrumentation. Modifications can easily be incorporated in the oligomers according to the functionalities present on the solid surface. This method is preferred for generating low to moderate density oligonucleotide arrays.

Generally, in the preparation of oligonucleotide arrays by post-synthesis immobilization, the following chemical steps are needed to be discussed: (a) the choice of substrate material and its primary functionalization, (b) the synthesis of oligonucleotides with specific functional groups, (c) the activation of the substrate functionality, (d) the activation of the oligonucleotide terminal group, and (e) the immobilization reaction, i.e. the reaction of the activated substrate and oligonucleotide.

Several surface materials have been tested so far, such as nylon, nitrocellulose, polypropylene, polystyrene, silicon, glass, teflon, etc. Out of these, glass and polypropylene stand a good chance because these materials can easily be derivatized to generate functional groups on the surface, viz., aminoalkyl, carboxyl, aldehyde, mercaptoalkyl, etc. Glass has an additional advantage in that the currently used laser scanners can also be used.

Most of the immobilization reactions involve the attachment of electrophilic/nucleophilic glass surfaces with nucleophilic/electrophilic oligonucleotides. In this method, individual oligonucleotides may be synthesized separately, purified and then they can be immobilized at defined sites on a solid surface. A number of alternative methods have been reported for the post-synthesis immobilization of oligonucleotides on a variety of surfaces (Table 1) (Ind. J. Biochem. Biophys., 40 (2003) 377; Curr. Med. Chem., 8 (2001) 1213; Curr. Pharm. Biotechnol., 4 (2003) 379). Recently, Kumar and Gupta (Bioconjugate Chemistry, 14 (2003) 507) developed a simple method to construct oligonucleotide array on polymer surfaces, using commonly available reagents and chemistry with good efficiency and accuracy. The method involves the generation of hydroxyl functionalities, followed by their activation with tresyl chloride. The activated surface in the subsequent reaction is used to covalently immobilize oligonucleotides having mercaptohexyl- or aminohexyl functionalities to create oligonucleotide array. The constructed oligonucleotide arrays were successfully used to analyze oligonucleotides by hybridization technique.

TABLE 1

Immobilization of oligonucleotides

| S. No. | Support | Functional group on support | Modification on oligonucleotides |
|---|---|---|---|
| 1. | Glass | Thiol | 5'-Disulfide |
| 2. | Glass | Isothiocyanate | Amine |
| 3. | Glass | Aldehyde | Amine |
| 4. | Glass | Mercaptoalkyl | Maleimide |
| 5. | Glass | Bromoacetamide | Phosphorothioate |
| 6. | Glass | p-Aminophenyl | Carboxyl |
| 7. | Glass/Silicon | Epoxide | Amino |

TABLE 1-continued

Immobilization of oligonucleotides

| S. No. | Support | Functional group on support | Modification on oligonucleotides |
|---|---|---|---|
| 8. | Glass/polypropylene | N-Hydroxysuccinimidyl- or imidoesters | 5' or 3'-Amino |
| 9. | Silanized glass | Amino | 5'-Thiol |
| 10. | Polyacrylamide on glass | Amino or aldehyde | 3'-Amino or aldehyde |
| 11. | Glass coated with polyethyleneimine | Cyanuric chloride | 3'- or 5'-Alkylamino |
| 12. | Plastic | Acrylic groups | 5'-Acrylamide |
| 13. | CPG, PS, Sephacryl, chondroitin | Carboxylic, alkylamino on CPG | 5'-Aminoalkyl or 5'-phosphorylated |
| 14. | Silicon | Maleimide | Thiol |
| 15. | Quartz/Gold | Maleimide | Thiol |
| 16. | Gold | Disulfide | Thiol |

In yet another approach, Strother et al. (Nucleic Acids Res., 2000, 28, 3535-41) described a method for attaching the oligonucleotides to silicon surfaces, which were functionalized with t-Boc protected 10-aminodec-1-ene under the influence of UV light. After attachment, t-Boc group was removed and the resulting amino groups were coupled to thiolated oligonucleotides, using a heterobifunctional crosslinker, SSMCC (sulfo-succinimidyl 4-(N-maleimidomethyl)cyclohexane-1-carboxylate) to generate oligonucleotide arrays. The density of immobilized oligonucleotides was controlled by varying the attachment of t-Boc-10-aminodec-1-ene and partially allowing the deprotection of t-Boc group from t-Boc-10-aminodec-1-ene. It has been observed in studies related to construction of oligonucleotide arrays that glass surfaces coated with strongly electrophilic surfaces possess poor shelf life; hence, surfaces with groups such as aminoalkyl and mercaptoalkyl have mostly been used for this purpose. In a recent method, the attachment of an oligonucleotide modified with phosphorothioates in its backbone to a glass surface with bromoacetyl functionalities has been demonstrated. The oligonucleotide reported here contains a hairpin stem-loop structure, which serves as lateral spacers between neighbouring oligodeoxynucleotides and as a linker arm between the glass surface and the single stranded sequence of interest. The main advantage of this method is that both 3'- and 5'-ends are not modified, thus making them favorable for various enzymatic and labeling reactions.

In a slightly different approach, a protocol using photochemical immobilization technique has been developed. The method involves the covalent linking of the oligonucleotides to the surface during irradiation. Traditionally, psoralens, benzophenone, azides and carbenes are used for photochemical immobilization reactions, however, as these photoprobes suffer from several inherent drawbacks, anthraquinone has been employed, as in its excited state it can react with almost any C—H containing substrate. Using this conjugated system, oligonucleotides can be immobilized on surfaces such as polystyrene, polycarbonate, polypropylene, Teflon and silylated glass, etc. As discussed above, a variety of surface chemistries have been developed for making synthetic oligonucleotide microarrays on solid- or polymeric surfaces. The production and optimal performance of these arrays depends on some factors. One of them is a linker required to create a suitable distance between surface and the oligonucleotide sequence that is to be used for hybridization experiments; the distance minimizes the steric hindrances with the incoming molecules as well as provides accessibility to them. In some cases, polyethylene glycol and oligothymidines have been employed as spacers. Other factors include physical and chemical properties of surface, derivatization of slides with suitable functional groups, incorporation of suitable modified functional groups on oligonucleotides, density of oligonucleotides on the surface, delivery of tiny volumes of spotting solution, the blocking of unreacted functional groups on the surface, length and type of target DNA molecules, hybridization and washing conditions, etc. Another problem related to uniform distribution of spotted oligonucleotide has been addressed by mixing a suitable solvent with properties, such as good wettability and low evaporation rate; betaine and dimethylsulfoxide are the most commonly used reagents for this purpose.

Most of these methods utilize modified oligonucleotides either at 3'- or 5'-end to prepare oligonucleotides arrays on the polymeric surfaces. Mostly, aminoalkyl, mercaptoalkyl, carboxyl, aldehyde, phosphate groups in oligomers are required, where one has to require either phosphoramidite reagents or engineered polymer supports to generate desired functionalities. Finally, these modified oligomers are immobilized on a variety of polymer surfaces with appropriate reactive functionality in the presence or absence of a suitable coupling reagent.

OBJECTS OF THE INVENTION

The present invention aims to develop an improved, rapid and simple method to immobilize oligonucleotides on the surface of choice.

Thus, the main objective of the present invention is, therefore, to provide an improved process of preparation of oligonucleotide microarrays.

Another objective of the present invention is to provide a simple, rapid and economical process of preparation of microarrays on a surface of choice.

Yet another objective is to provide an improved process of preparation of microarrays where the least modified oligonucleotides are required for immobilization.

A further object of the present invention is to provide an improved method of fixing oligonucleotides on the polymer surfaces without affecting the hybridization ability of the oligomer sequences.

Another objective of the present invention is to provide an improved method of tethering oligonucleotides on the polymer surface by making silyl-olignucleotide conjugates followed by attachment of the conjugate on to the surface of choice.

Yet another objective of the present invention is to prepare microarrays of sufficient chemical and thermal stability.

Still another objective of the present invention is to provide an improved method for the immobilization of DNA sequences as well as PCR amplicons after suitable modifications.

SUMMARY OF THE INVENTION

Accordingly the present invention provides a process for the construction of oligonucleotide microarrays on glass or other polymer surfaces, comprising;

(i) reacting 3'- or 5'-phosphorylated oligonucleotides with epoxy functionalized polymer surfaces or glycidyloxyropyltriethoxysilane (GOPTS) via route A and B (Image I and II), respectively, in a buffer containing DMSO (5-20%), at a pH in the range of 5-9, at an elevated temperature ranging between 35 to 65° C., for a period ranging between 1 to 6 h, washing to remove unreacted component to obtain the desired oligonucleotide microarray, (ii) visualizing the said microarray obtained in step (i) by hybridizing it with the labeled complementary oligomer sequence followed by scanning under a laser scanner.

In an embodiment of the invention wherein the route A comprises:

(i) preparing phosphoryl-, thiophosphoryl-, phosphorothioate- and mercaptoalkylated oligonucleotides, (ii) making oligonucleotide-silyl conjugate by mixing equimolar quantities of modified oligonucleotide with glycidyloxypropyltriethoxysilane in a suitable buffer of appropriate pH containing dimethylsulfoxide (DMSO) (5-20%), (iii) spotting the conjugate on the slide and incubating it at elevated temperature for a period up to 6 h, (iv) alternatively, placing the spotted slide in a microwave oven for a period up to 30 mm, (v) washing of the slide and subjecting it to hybridization with labeled complementary oligomer sequence, (vi) scanning under a laser scanner.

In another embodiment of the invention wherein the Route B comprises:

(i) preparing phosphoryl-, thiophosphoryl-, phosphorothioate- and mercaptoalkylated oligonucleotides, (ii) coating of epoxy-reagent (mentioned above) on the surface of slide, (iii) dissolving the oligomer sequence in buffer containing DMSO (5-20%) and spotting on an epoxy coated glass microslide, (iv) incubating the plate at elevated temperature for a period up to 6 h (v) alternatively under microwave irradiation for a period up to 30 min, (vi) washing the glass micro slide and hybridizing with complementary oligonucleotides labeled with a fluorescent dye, (viii) visualizing the spots under laser scanner.

In an embodiment to the present invention, the 3'- or 5'-modified oligonucleotide suitable for use in the present method may be selected from Phosphorylated oligonucleotides, thiophosphorylated oligonucleotides, phosphorothioate-oligonucleotides, mercaptoalkylated oligonucleotides, modified hair-pin probes, P—S molecular beacon and the like.

In another embodiment, the length of an oligonucleotide sequence may be selected from 15 mer to 70mer.

In still another embodiment, the length of alkyl chain in mercaptoalkylated oligonucleotides may be selected from three to twelve carbon atoms.

In yet another embodiment, the epoxy reagent may be selected from 3-glycidyloxypropyltriethoxysilane, 3-glycidyloxypropyldimethoxymethylsilane, butanediol-1,4-diglycidyl ether and the like.

In still another embodiment, the oligonucleotides may be immobilized via Route A or Route B.

In another embodiment, buffer may be selected from ammonium acetate, sodium phosphate, saline-sodium citrate (SSC), N-methylimidazole and the like.

In another embodiment, the concentration of the buffer used ranges from 0.1 to 1.0M.

In yet another embodiment, the concentration of DMSO in the spotting solution varies from 5 to 20% of the total volume.

In another embodiment, the spotted microslide is incubated at the elevated temperature ranging from 35 to 65° C. for a period up to 6 h.

In a further embodiment of the invention the spotted microslide is incubated under the microwave irradiation for a period up to 30 min.

In yet another embodiment, the surface material may be selected from a group of modified synthetic and natural polymers such as polystyrene, polyethylene, polypropylene, polymethylmethacrylate (PMMA), polyvinylpyrrolidone, glass, silica gel and the like.

In still another embodiment, the microwave power used to effect the reaction may be selected in the range from 150 to 800 W for a period up to 30 min.

DETAILS OF THE INVENTION

The novelty of the present invention lies in developing a novel method for the preparation of oligonucleotide microarrays obviating the drawbacks of the above listed methods, to an extent, such as time consuming complex chemical reactions, preparation of modified supports/oligomer modifying reagents, use of activating/condensing reagent, low signal to noise ratio, poor immobilization and hybridization efficiencies, etc. Further, the prepared arrays can be used to detect single or multiple nucleotide mismatches using hybridization assay (Bioconjug. Chem., 2006, 17, 1184; BioMed. Chem. Lett., 2006, 16, 5654).

The steps involved in the invention are given below:

1. Reaction of epoxy functional groups with phosphorylated oligonucleotide: The phosphate group bearing oligonucleotides were dissolved in 0.1M N-methylimidazole buffer containing 10% DMSO and spotted manually (0.5 µl) on an epoxy coated glass microslide.

2. The spotted slide was kept at 45° C. for 2 h followed by washings with SSC buffer, pH 7.1 (3×40 ml). The resulting spots were hybridized with complementary oligonucleotides labeled with a fluorescent dye (fluorescein, tetrachlorofluorescein, cyanine 3, cyanine 5, Texas Red, tetramethylrhodamine, etc.). The hybridized spots were visualized under laser scanner (as shown in Image II of the specification).

3. Alternative to step 2, the spotted slide was kept inside a microwave oven, operating at 800 W, and irradiated for 10 min with 10 s stroke. Then the plate was washed with SSC buffer, pH 7.1 (3×40 ml). The resulting spots were hybridized with complementary oligonucleotides labeled with a fluorescent dye. The hybridized spots were visualized under laser scanner.

The following examples concerning the preparation of oligonucleotide microarrays on polymeric surfaces and their application for detection of mutations are provided to illustrate the invention and should not be construed to limit the scope of the invention.

BRIEF DESCRIPTION OF THE DRAWINGS

The drawings will now be described without narrowing the scope of the invention:

FIG. 1 is Image I: Immobilization of modified oligonucleotides on epoxy surface.

FIG. 2 is Image 11: Fluorescence map obtained after hybridization and scanning under a laser scanner.

FIG. 3 is Image III: Fluorescence map to detect nucleotide mismatches and specificity of immobilization via hybridization with fluoresceinyl-d (CTT CTT TTT CCT GTT ACC GT) (40 μM). Lane 1, d(ACG GTA ACA GGA AAA AGA AG)-$OPO_3^{2-}$; Lane 2, d(ACG GTA ACA GGA AAA AGC AG)-$OPO_3^{2-}$; Lane 3, d(ACG GTA ACA CGA AAA AGC AG)-$OPO_3^{2-}$; Lane 4, d(TTT TTT TTT TTT TTT TTT TT)-$OPO_3^{2-}$.

FIG. 4 is Image IV: Detection of nucleotide mismatches and specificity of immobilization via hybridization with labeled oligonucleotide, viz., Fluoresceinyl-d (CTT CTT TTT CCT GTT ACC GT) (40 μM). Lane 1, $HS(CH_2)_6OPO_3$-d(ACG GTA ACA GGA AAA AGA AG); Lane 2, $HS(CH_2)_6$ $OPO_3$-d(ACG GTA ACA GGA AAA AGC AG); Lane 3, $HS(CH_2)_6OPO_3$-d(ACG GTA ACA CGA AAA AGC AG); Lane 4, $HS(CH_2)_6OPO_3$-d(TTT TTT TTT TTT TTT TTT TT).

FIG. 5 is Image V: Comparison of hybridization efficiency. I: Phosphate-Epoxide; II: Thiophosphate-Epoxide; III: Thiol-Epoxide; IV: NTMTA method (Nucl. Acids Res., 32 (2004) e80); V: Amine-Epoxide (Nucl. Acids Res., 22 (1994) 2121); VI: Disulfide Approach (Nucl. Acids Res., 28 (2007)e71).

EXAMPLE 1

Preparation of Epoxy Coated Glass Microslides (a) Virgin glass microslides were cleaned with anhydrous ethanol and dried under vacuum. These plates were treated with a solution of 3-glycidyloxyropyltriethoxysilane (GOPTS) in toluene for 2 h at 50° C. with occasional agitation. After cooling to room temperature, the microslides were washed sequentially with toluene (2×50 ml), acetonitrile (2×50 ml) and diethyl ether (2×50 ml) and dried under vacuum in a desiccator. Then the support was dried under vacuum.

(b) Aminosilane-glass slides were activated by rinsing with a solution of diisopropylethylamine:triethylamine (1:1, v/v) followed by washing with anhydrous ethanol. The dried aminosilane glass microslides were treated with a solution of butanediol-1,4-diglycidyl ether (1M). The slides were shaken occasionally for 8 h at 45° C. Then the slides were rinsed with acetonitrile (4×50 ml) and diethylether (2×50 ml), respectively. The slides were kept in an amine-free desiccator for drying purpose.

EXAMPLE 2

Immobilization of 3'-phosphorylated Oligonucleotides Via Route A

The attachment of 3'-phosphate-modified oligonucleotides (synthesized following the standard protocol, Tet. Lett., 1991, 32, 967) to glass surfaces was performed via an epoxide ring opening reaction by phosphate group (Route B). The 3'-phosphate oligonucleotide, d(TTT CTT GCT GGT CTC GCT-$PO_4$), was diluted to a concentration of 5 to 40 μM in 0.1M N-methylimidazole buffer and spotted onto the epoxy-coated glass slides surface. Arrayed oligomer was incubated in a humid chamber for 2 h at 45° C., followed by blocking of excess epoxy rings with 0.1M Tris, pH 9.0 for 1 h. The plates were then washed with 0.1M SSC buffer, pH 7.5. Then the slides were dried under vacuum in a desiccator and store it in refrigerator until their use.

EXAMPLE 3

Hybridization Assay

Hybridization experiment was performed in the following manner. The spotted glass microslide as obtained in example 2 was kept in a moist hybridization chamber and the spotted area was covered with 50 μl solution of complementary labeled oligomer, Fluoresceinyl-d(AGC GAG ACC AGC AAG AAA), of concentration 50 μM in 0.1M SSC buffer containing 1M sodium chloride. The area was then covered by cover-slip and incubated the plate at 60° C. for 10 min, then allowed to cool at room temperature and then to 10° C. in the cold chamber. The plate was kept at this temperature for 30 min for complete annealing to form stable duplex. After washings with same buffer, the microslide was dried and visualized under laser scanner.

EXAMPLE 4

Covalent coupling of oligonucleotides onto epoxy-coated microslide: 5'-Phosphorylated oligonucleotide, [$O_3PO$-d (TAA GCT TTC AAG CGA TAC CC)] (2.5 O.D. at 260 nm) and [$O_3PO$-d(TAT CCT TTG TAG GGA TAG GC)] (2.0 O.D. at 260 nm), were dissolved in 100 mM N-methylimidazole buffer (100 μl). Oligonucleotides were spotted manually (0.5 μl) in triplicate on the epoxy-coated glass microslide. The slide was kept in microwave oven and irradiated for 10 min with 10 s each stroke. After each stroke, the plate was cooled on an ice bath. Subsequently, the microslide was thoroughly washed with 0.1M SSC buffer and the spots were hybridized with complementary oligomer, Fluoresceinyl-d(GGG TAT CGC TTG AAA GCT TA). After incubation at 35° C. for 4.5 h, the slide was washed with 0.1M carbonate buffer containing sodium chloride (1M). The plate was kept inside a laser scanner and the fluorescent spots were visualized. The oligonucleotide spots, which hybridized with the complementary oligomer, gave blue spots at 515 nm and the oligomer spots, which did not hybridize, could not be detected.

EXAMPLE 5

Covalent coupling of oligonucleotides onto epoxy-coated microslide: 5'-Thiophosphorylated oligonucleotides (Chem.

Lett., 1997, 12, 1231), [O$_2$SPO-d(TAA GCT TTC AAG CGA TAC CC)] (2.5 O.D. at 260 nm) and [O$_2$SPO-d(TAA GCT TTC AAG AGA TAC CC)] (2.0 O.D. at 260 nm), were dissolved in 100 mM N-methylimidazole buffer (100 µl). Rests of the steps were followed as described in Example 4. Oligonucleotides were spotted manually (0.5 µl) in triplicate on the epoxy-coated glass microslide. The slide was kept in microwave oven and irradiated for 10 min with 10 s each stroke. After each stroke, the plate was cooled on an ice bath. Subsequently, the microslide was thoroughly washed with 0.1M SSC buffer and the spots were hybridized with complementary oligomer, Fluoresceinyl-d(GGG TAT CGC TTG AAA GCT TA). After incubation at 35° C. for 4.5 h, the slide was washed with 0.1M carbonate buffer containing sodium chloride (1M). The plate was kept inside a laser scanner and the fluorescent spots were visualized. The oligonucleotide spots, which hybridized with the complementary oligomer, gave blue spots at 515 nm and the oligomer spots. However, the oligomer with one mismatch showed blue spots with diminished fluorescence intensity.

EXAMPLE 6

Immobilization of 3'-phosphorylated Oligonucleotides Via Route A

The attachment of 3'-phosphate-modified oligonucleotides to glass surfaces via route B was performed in the following manner. Oligomer sequence, d(TTT CTT GCT GGT CTC GCT)-PO$_4$, (2.0 O.D. A$_{254}$), dissolved in 0.1M N-methylimidazole buffer (200 µl), was reacted with 3-glycidyloxypropyltrimethoxysilane (10 eq.), taken in ethyl alcohol (100 µl). The eppendorf tube containing the reaction mixture was kept inside a microwave oven and irradiated for 15 min (90×10 s). No exposure was given more that 10 s and after each exposure, the contents were cooled in ice-cold water. Then the reaction mixture was concentrated, dd water (100 µl) was added and the tube was vortexed. The suspension was centrifuged at 10000 rpm in a table-top mini-centrifuge (Eppendorf). The supernatant was collected, concentrated and repeated the same steps. Finally, the silyl-oligonucleotide conjugate was dissolved in water (50 ml) to make its stock solution. For spotting the oligomer sequence on the glass surface, the conjugate was further diluted to make a final solution of 10 µM concentration and spotted in duplicates on a pre-cleaned glass microslide. The spotted microslide, under moist environment, was placed in an incubator at 45° C. for 40 min. Then the microslide was immersed in 0.1M Tris buffer (50 ml), pH 9.0 for 30 min followed by washing with 0.1M SSC buffer, pH 7.0 (3×35 ml) and drying under vacuum in a desiccator. Hybridization assay was performed as described in Example 4.

EXAMPLE 7

Immobilization of Phosphorothioate Molecular Beacon

The attachment of phosphorothioate-molecular beacon to glass surfaces was performed via an epoxide ring opening reaction by P—S group (Route B). The molecular beacon, FAM-d(ACGCT TTT TTT TTTps TTT TTT TTT TT AGCGT)-dabsyl, was diluted to a concentration of 5 µM in 0.1M N-methylimidazole buffer and spotted onto the epoxy-coated glass slide surface. Arrayed beacon was incubated in a humid chamber for 2 h at 45° C., followed by blocking of excess epoxy rings with 0.1M Tris, pH 9.0 for 1 h. The plate was subsequently washed with 0.1M SSC buffer (3×35 ml), pH 7.5. Then the slide was dried under vacuum in a desiccator and subjected to hybridization assay as described in Example 4 using d(AAA AAA AAA AAA AAA AAA AA) as a complementary oligomer. The plate after hybridization was visualized under laser scanner.

EXAMPLE 8

Immobilization of Phosphorothioate Molecular Beacon

The attachment of phosphorothioate-molecular beacon to glass surfaces was performed via an epoxide ring opening reaction by P—S group (Route B). The molecular beacon, FAM-d(ACGCT TTT TTT TTTps TMT TTT TTT TT AGCGT)-dabsyl, was diluted to a concentration of 5 µM in 0.5M N-methylimidazole buffer containing DMSO (5%) and spotted onto the epoxy-coated glass slide surface. Arrayed beacon was incubated in a humid chamber for 2 h at 45° C., followed by blocking of excess epoxy rings with 0.1M Tris, pH 9.0 for 1 h. The plate was subsequently washed with 0.1M SSC buffer (3×35 ml), pH 7.5. Then the slide was dried under vacuum in a desiccator and subjected to hybridization assay as described in Example 4 using d(AAA AAA AAA AAA AAA AAA AA) as a complementary oligomer. The plate, after hybridization, was visualized under laser scanner.

EXAMPLE 9

Immobilization and Detection of 5'-mercaptohexylated Oligonucleotides Via Route A The attachment of 5'-mercaptohexylated oligonucleotides (synthesized following the standard protocol, BioMed. Chem. Lett., 6 (1996) 683) to glass surface was performed via an epoxide ring opening reaction by mercaptoalkyl group (Route B). The 5'-phosphate oligonucleotide, HS(CH$_2$)$_6$ OPO$_3$-d(TTT CTT GCT GGT CTC GCT), was diluted to a concentration of 5 to 40 µM in 0.1M N-methylimidazole buffer and spotted onto the epoxy-coated glass slides surface. Arrayed oligomer was incubated in a humid chamber for 3 h at 45° C., followed by blocking of excess epoxy rings with 0.1M Tris, pH 9.0 for 1 h. The plates were then washed with 0.1M SSC buffer, pH 7.5. Then the slides were dried under vacuum in a desiccator and subsequently, the spots were hybridized with complementary oligomer, Fluoresceinyl-d (AGC GAG ACC AGC AAG AAA). After incubation at 35° C. for 4.5 h, the slide was washed with 0.1M carbonate buffer containing sodium chloride (1M). The plate was kept inside a laser scanner and the fluorescent spots were visualized. The oligonucleotide spots, which hybridized with the complementary oligomer, gave blue spots at 570 nm.

EXAMPLE 10

Detection of Mismatches

In order to detect the mismatches and investigate the specificity of the system, four oligonucleotides, viz., d (ACG GTA ACA GGA AAA AGA AG)-OPO$_3^{2-}$, d (ACG GTA ACA GGA AAA AGC AG)-OPO$_3^{2-}$, d (ACG GTA ACA CGA AAA AGC AG)-OPO$_3^{2}$ and d (TTT TTT TTT TTT TTT TTT TT)-OPO$_3^{2-}$ (5 µM) having zero, one and two mismatches and non-complementary probe, were spotted on an epoxylated glass slide (under microwave irradiation) followed by capping and usual washings. Subsequently, the spots on the microslide were hybridized with a complementary-labeled Fluoresceinyl-d (CTT CTT TTT CCT GTT ACC GT) and kept at 45° C. for 1 h and then at room temperature for 12 h. After washings with hybridization buffer, 2×SSC buffer (pH 7) (2×5 min) and 1×SSC (2×10 min), the microslide was subjected to a laser scanning. Fluorescence was only detected at spots exposed to the appropriate complement. Image III of the specification clearly shows the base mismatches, the perfectly matched sequence gave the maximum intensity (lane 1) while spots having one (lane 2) and two (lane 3) mismatches showed fluorescence intensity in decreasing order. No measurable non-specific hybridization signal from the non-complementary control (lane 4) was detected, demonstrating that non-specific hybridization did not occur. The signal to noise ratio was on an average >98 as calculated from the signals obtained from complementary hybridized spots and non-complementary hybridized spots.

ADVANTAGES OF THE INVENTION

1. The process is simple, rapid and novel.
2. The synthesis of modified oligonucleotides is easy to assemble.
3. Silyl-oligonucleotide conjugate is sufficiently stable for 5-6 months at 4° C.
4. The reactions involving silylation are clean and do not result in any side product formation.
5. The reagent specifically reacts with phosphate monoesters, phosphodiesters do not contribute much (~12%).
6. A variety of phosphoryl-, thiophosphoryl-, phosphorothioate-, mercaptoalkylated bioactive ligands can be immobilized without affecting their activity.
7. The reagent can be used in both the ways, i.e. silylation of the surface followed by reaction with the biomolecule (e.g. phosphoryl- or thiophosphoryl- or phosphorothioate- or mercaptoalkylated oligonucleotides) and/or reaction of the reagent with biomolecule followed by immobilization of silyl-conjugate on to the glass surface.
8. The immobilization and hybridization efficiencies are quite high.
9. The method results in almost negligible fluorescence.
10. The method can be used to immobilize DNA sequences as well as PCR amplicons

We claim:
1. A process for the construction of oligonucleotide microarrays on glass or other polymer surfaces, which comprises
    (i) reacting 3'- or 5'-phosphorylated oligonucleotides with glycidyloxyropyltriethoxysilane (GOPTS) at an elevated temperature to form a conjugate immobilized on a surface of a solid support via route A or route B,
    (ii) removing any unreacted components from the solid support, and
    (iii) labeling the conjugate by hybridizing it with a labeled complementary oligomer sequence and visualizing the labeled conjugate with a laser scanner, wherein
    route A comprises mixing glycidyloxyropyltriethoxysilane (GOPTS) with the oligonucleotides to obtain the conjugate, by reacting the 3' or 5' phosphate with the epoxide, and then spotting the conjugate on the surface; and wherein
    route B comprises coating the surface with glycidyloxyropyltriethoxysilane (GOPTS), and then spotting the oligonucleotides on the glycidyloxypropyltriethoxysilane (GOPTS) coated surface wherein the 3' or 5' phosphate of the oligonucleotide reacts with the epoxide of GOPTS.

2. The process as claimed in claim 1, wherein route A further comprises
    the oligonucleotides and glycidyloxypropyltriethoxysilane (GOPTS) in a buffer containing 5-20% DSMO at a temperature of 35 to 65° C. to obtain the conjugate, and incubating the spotted conjugate at an elevated temperature for a period up to 6 hours, or microwaving the spotted conjugate for a period up to 30 minutes.

3. The process as claimed in claim 1, wherein route B further comprises
    dissolving the oligonucleotides in a buffer containing 5-20% DMSO, and incubating the spotted oligonucleotides at an elevated temperature for a period up to 6 hours, or microwaving the spotted oligonucleotides for a period up to 30 minutes.

4. The process as claimed in claim 1, wherein the elevated temperature is provided by thermal heating or microwave irradiation.

5. The process as claimed in claim 1, wherein the elevated temperature is provided by thermal heating up to 6 hours.

6. The process as outlined in claim 1, wherein the elevated temperature is provided by microwave irradiation up to 30 minutes.

7. The process as claimed in claim 1, wherein the buffer is selected from the group consisting of ammonium acetate, SSC, and N-methylimidazole.

8. The process as claimed in claim 1, wherein the surface is functionalized with a reagent selected from the group consisting of 3-glycidyloxypropyltriethoxysilane, 3-glycidyloxypropylmethyldimethoxysilane, and butandiol-1,4-diglycidyl ether.

9. The process as claimed in claim 1, wherein the length of the sequences of the oligonucleotides is from 15mer to 70mer.

10. The process as claimed in claim 1, wherein the 3'- or 5'- or both ends of the oligonucleotides is selected from the group consisting of phosphate, thiophosphate, phosphorothioate, and mercaptoalkyl.

11. The process as claimed in claim 1, wherein the solid support is selected from the group consisting of glass, polystyrene, polypropylene, polyethylene, and silicon wafers.

12. The process as claimed in claim 1, wherein the elevated temperature ranges from 35° C. to 55° C.

13. The process as claimed in claim 1, wherein the oligonucleotides are reacted with glycidyloxyropyltriethoxysilane (GOPTS) for a period of 2 to 4 hours.

14. The process as claimed in claim 1, wherein the oligonucleotide microarrays are useful for detecting the nucleotide mismatches (mutations) by observing the change in the intensity of the labeled conjugate.

15. The process as claimed in claim 1, wherein the spotted conjugate or the spotted oligonucleotide is incubated in a microwave oven at a power of 600 W to 800 W for a period of 10 to 20 minutes.

16. The process as claimed in claim 1, wherein the oligonucleotide microarrays can be used to immobilize DNA sequences as well as PCR amplicons.

17. The process as claimed in claim 1, wherein the hybridization ability of the oligonucleotides is unaffected by being conjugated and immobilized to the surface.

18. The process as claimed in claim 1, wherein the oligonucleotides are reacted with glycidyloxyropyltriethoxysilane (GOPTS) at a pH of 5-9.

* * * * *